T. B. OLIVER.
BIRD CAGE.
APPLICATION FILED APR. 2, 1912.

1,070,063.

Patented Aug. 12, 1913.

2 SHEETS—SHEET 1.

Witnesses
C. L. Weed
M. P. Nichols

Thomas B. Oliver
Inventor
by Seymour Earle
Atty

COLUMBIA PLANOGRAPH CO., WASHINGTON, D. C.

T. B. OLIVER.
BIRD CAGE.
APPLICATION FILED APR. 2, 1912.

1,070,063. Patented Aug. 12, 1913.
2 SHEETS—SHEET 2.

Witnesses
C. L. Weed
M. P. Nichols

Thomas B Oliver
Inventor
by Seymour & Earle
Attys

UNITED STATES PATENT OFFICE.

THOMAS B. OLIVER, OF NEW HAVEN, CONNECTICUT, ASSIGNOR TO THE A. B. HENDRYX CO., OF NEW HAVEN, CONNECTICUT, A CORPORATION.

BIRD-CAGE.

1,070,063.  Specification of Letters Patent.  Patented Aug. 12, 1913.

Application filed April 2, 1912.  Serial No. 688,009.

*To all whom it may concern:*

Be it known that I, THOMAS B. OLIVER, a citizen of the United States, residing at New Haven, in the county of New Haven and State of Connecticut, have invented a new and useful Improvement in Bird-Cages; and I do hereby declare the following, when taken in connection with the accompanying drawings and the characters of reference marked thereon, to be a full, clear, and exact description of the same, and which said drawings constitute part of this application, and represent, in—

Figure 1:
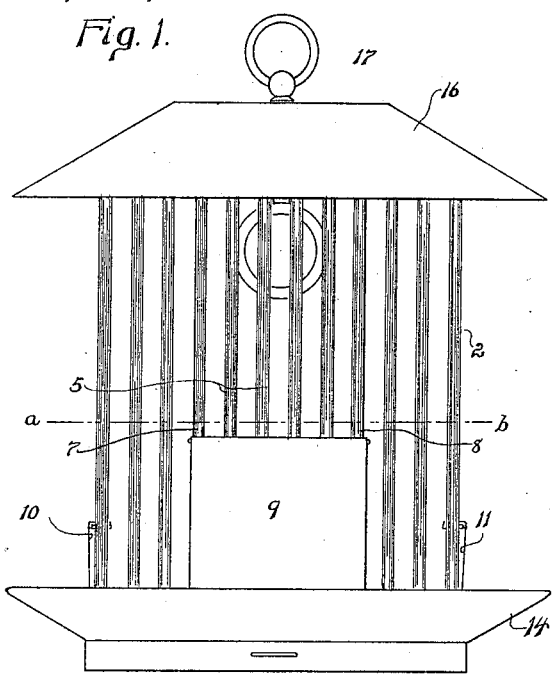
Figure 2:
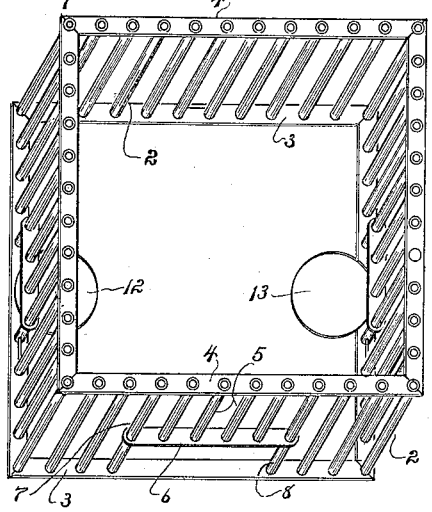
Figure 3:
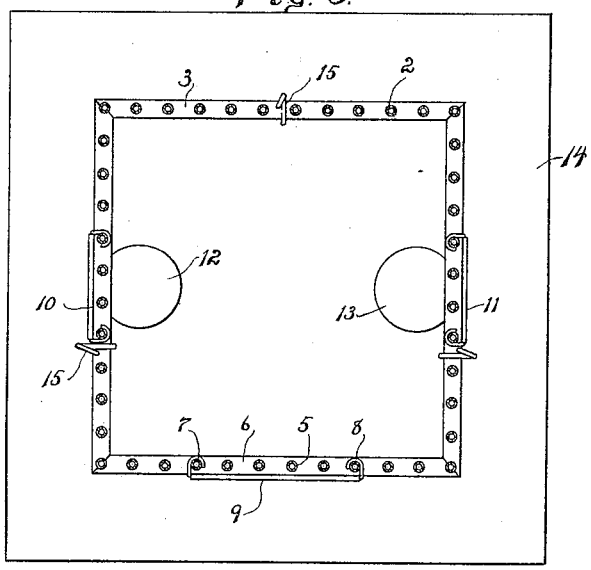
Figure 4:
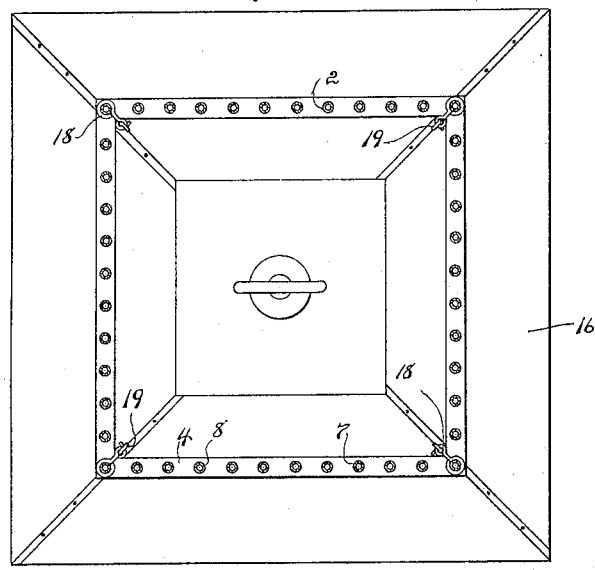
Figure 7:
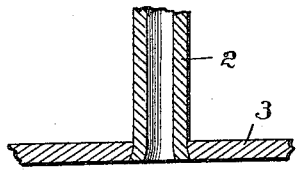
Figure 5:
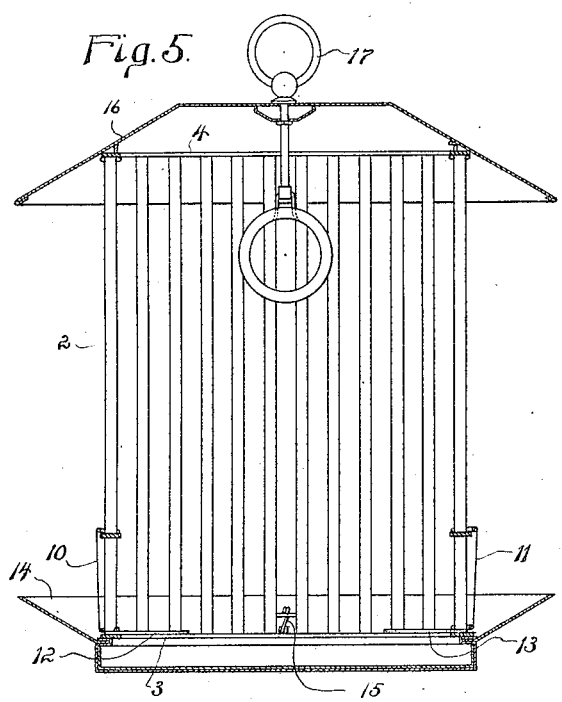
Figure 6:
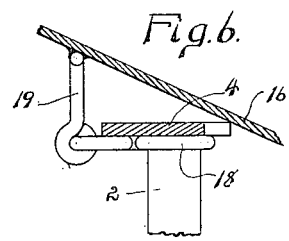

Figure 1 a front view of a bird cage constructed in accordance with my invention. Fig. 2 a perspective view of the frame of the cage detached. Fig. 3 a sectional view on the line *a—b* of Fig. 1, looking down. Fig. 4 a view of the same, looking up. Fig. 5 a view in vertical section. Fig. 6 a broken sectional view of one corner of the cage showing the manner of attaching the top to the frame. Fig. 7 a broken sectional view on an enlarged scale showing the manner of interlocking the tubes with the plates.

This invention relates to an improvement in bird cages, the object being to produce a cage which will have the appearance of being a very heavy cage and yet will be comparatively light; and the invention consists in details of construction and arrangement of parts as will be hereinafter described and particularly recited in the claim.

In carrying out my invention I construct the sides of the cage, which may be square, round or any other desired form, from sections of metal tubing 2. The lower ends of these tubes extend through and are upset beneath the bottom plate 3, while the upper ends extend through and are upset above a top plate 4. These plates 3 and 4 give the desired form and are made up in sections. At the front several of the tubes 5 are shorter than the main tubes and are upset in a door casing 6 which is a strip of metal corresponding to the bottom plate 3 and through the ends of which the tubes 7 and 8 at the side of the door extend. The door 9 is arranged to slide vertically on the bars 7 and 8. At the sides the central tubes stop short of the lower plate 3 and are supported in the same manner as the tubes 5 forming feed-cup openings which are closed by vertically sliding feed-opening doors 10 and 11. Secured to the lower plate 3 adjacent to the feed-cup openings are feed-cup holding disks 12 and 13. These are struck up from sheet metal and secured to the lower plate 3. The lower plate 3 is adapted to be secured to the base 14, of usual construction, by the usual hooks 15, and secured to the upper plate is a top 16 provided with the usual suspending hook or eye 17. The top plate 4 is secured to the top 16 by loops 18 which surround the corner tubes and which are coupled with eyes 19 soldered or otherwise secured to the underside of the top 16. The tubes from which the sides of the frame are formed, may be very much larger than the wires usually employed in the construction of cages without materially increasing the weight. Furthermore, by using tubes in the formation of the sides of the cage sufficient rigidity is attained so that all transverse stays or bands may be omitted. The ends of the tubes are readily interlocked with the top and bottom plates by slightly expanding the ends so that the expense of assembling the cage is no more, if as much as the attachment of a number of wires. By employing tubes a particularly pleasing design is obtained.

I claim:—

A bird cage the sides of which are formed from metal tubes, top and bottom plates having perforations through which the ends of the tubes extend, the ends of the tubes expanded to interlock them with the said plates, loops secured to the upper ends of the tubes at the corners, a base detachably connected with the bottom plate, and a top connected with said loops.

In testimony whereof, I have signed this specification in the presence of two subscribing witnesses.

THOMAS B. OLIVER.

Witnesses:
 NATHAN W. HENDRY,
 G. A. AUSTIN.

Copies of this patent may be obtained for five cents each, by addressing the "Commissioner of Patents, Washington, D. C."